Patented Sept. 12, 1950

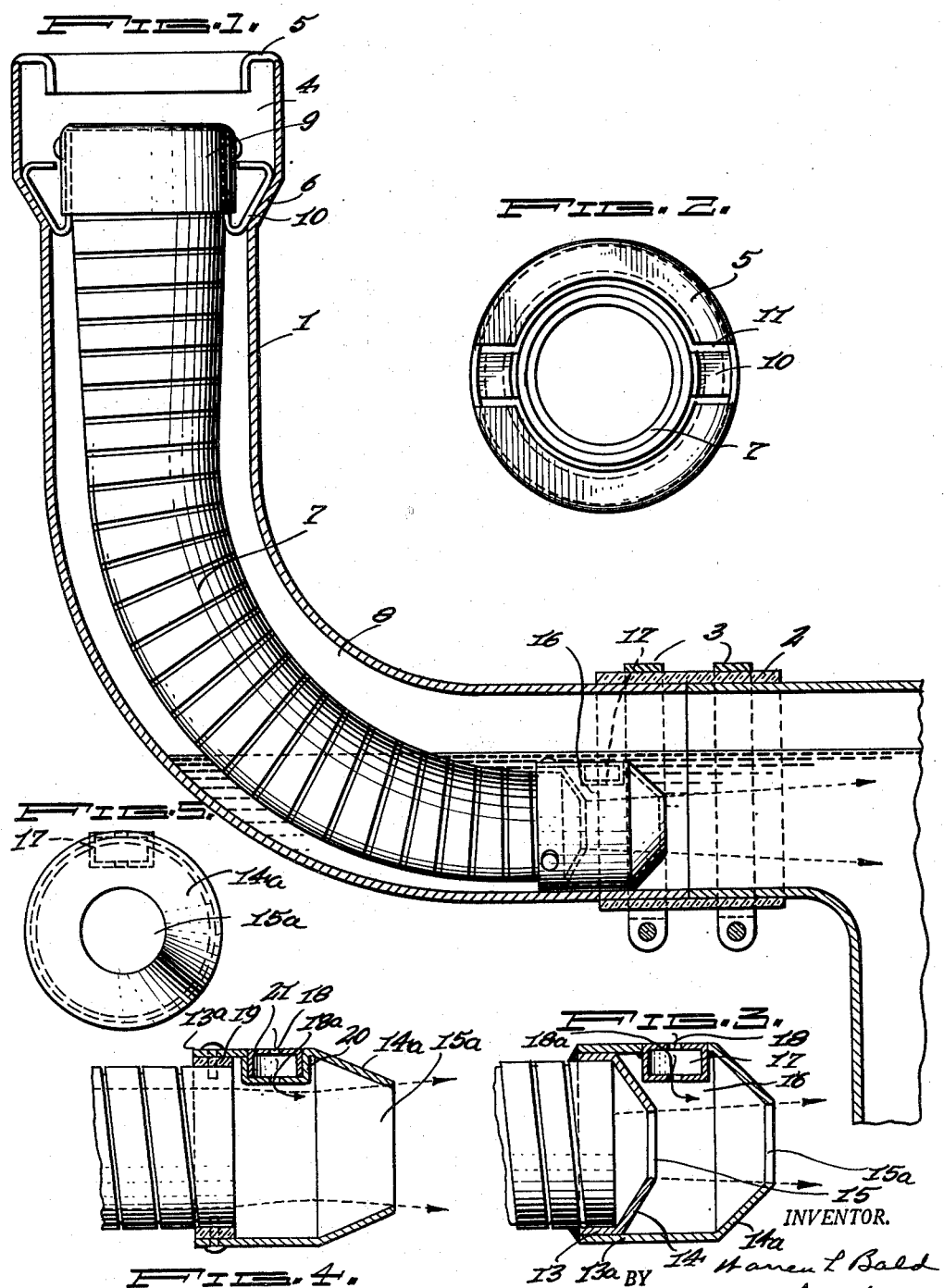

2,522,207

UNITED STATES PATENT OFFICE 2,522,207

FILLING DEVICE FOR FUEL TANKS

Warren L. Bald, Los Angeles, Calif.

Application August 16, 1946, Serial No. 691,112

1 Claim. (Cl. 116—109)

This invention relates to a filling device for fuel tanks.

Difficulty is often experienced in filling automotive fuel tanks because of the curved nature of the filler pipes leading into the tanks. Ordinarily, the tanks have no means of venting the air and fuel vapors. The vapors arising during the fuel operation and the air compressed in the tank by the rising fuel level have, therefore, a tendency to pass outward and thus to impede the stream of the ingoing fuel. The fuel, on the other hand, often blocks off the entire cross-section area of the filler pipe and prevents the escape of the air and fuel vapors. This causes the air or vapor pressure in the tank to rise to a point where the air or vapor is blown outward through the neck of the filler pipe with an ensuing splash-back or blowout.

Attempts have been made to obviate this difficulty by placing a separate inlet tube of smaller diameter into the regular filler tube. A space is thus provided between the two tubes for the venting of air and fuel vapors. This kind of construction has the inherent drawback that it fails as soon as the fuel level has reached a point where it plugs up the venting passageway. If the fueling operation is continued the hazard of a splash-back or blowout exists just as much as if there were no separate inset tube.

The only efficacious means of preventing a splash-back and waste of fuel is to slow down or to discontinue entirely the feeding of fuel once the venting passage is blocked off. It is a specific object of the invention to provide an indicating device which will warn the operator to turn off the valve of the fuel pump hose or to diminish the flow of fuel when the level in the tank has reached a critical stage. The need for a device of that kind is manifest when it is borne in mind that the filling of fuel into automotive vehicles is customarily done by unskilled or semi-skilled workers, and that the amount of fuel wasted in the conventional type of filling is of considerable extent.

More specifically, the object of the invention, therefore, is to incorporate in the filler tube a device which will cause a sound to be heard as long as the venting of the tank is properly functioning but which will be silenced when the fuel level threatens to obstruct the venting passage.

My invention will be explained with reference to the drawings of which

Fig. 1 is a side elevation, partly in section, with the fuel having reached a level where the sound device is shut off;

Fig. 2 is a top plan view of the outer filler tube with the inner tube held in it;

Fig. 3 is a horizontal section through the nozzle of the inner tube with the sound device;

Fig. 4 is a similar view showing modified forms of the nozzle and sound device; and Fig. 5 is a front elevation of the nozzle.

Referring to the drawings, it will be seen that 1 is the customary filler tube which is connected to the tank of an automotive vehicle by a securing sleeve 2 and clamps 3. The tube is provided with an enlarged end 4 at the filler opening. This end piece has an inwardly bent lip 5 and is connected to the main body of the tube by a funnel-like portion 6. The inner tube, which is designated generally as 7, is made of a flexible material, a plastic or metal, and is of smaller diameter than the outer tube, thus defining a venting passage 8 through which trapped vapors and air may escape. The inner tube is held in place in the filler tube by suitable means, for instance by a bayonet latch, as shown in the drawing. For this purpose, the inner tube has a collar 9 and, attached to it, two opposed reversely bent spring members 10 which will pass through apertures 11 in the lip 5 and which nest against the conical portion 6 of the outer tube. This venting device forms no part of the invention and is known in the art.

According to the invention, the inner tube is provided with a nozzle consisting of two telescoped members each of which has a tubular side wall portion 13, 13a and a tapered front section 14 and 14a and, centrally disposed therein, aligned spout openings 15 and 15a. The outer member is of slightly larger diameter so as to fit over the interior member and its tubular side wall is of substantially greater length than the corresponding wall of the inner member. By this arrangement the beveled sections 14, 14a are spaced from each other defining an intermediate chamber 16 the lateral parts of which are outside the stream of the fuel which passes through the spout holes 15, 15a.

Disposed within this space is a sound device, which, in the embodiment shown, is constituted by a button type whistle 17. The device may be made either integrally with the nozzle, as shown in Fig. 3, or may be attached to it by proper securing means. According to the invention the whistle is provided with an air inlet 18 and an interior co-acting outlet 18a which constitute the communication between the venting passage and the air chamber 16 and are adapted to emit a sound occasioned by the air passing from the venting passage into the nozzle. It will be appreciated that the form of said sound device is shown by way of example only and that any device actuated by the flow of air can be used for the purpose of the invention.

The device operates as follows:

When fuel passes through the interior of the nozzle it creates a suction by causing air or vapor to be drawn inwardly from the venting passage to the air port of the whistle. This action causes the whistle to emit a sound which will continue as long as the air port of the whistle is free to allow the passage of air or vapor. When the fuel reaches a level which blocks off the orifice of the whistle and thus prevents air or vapor from being sucked inside the sound will be discontinued. The operator filling the fuel tank is thus made aware by the cessation of the sound that the tank is filled or nearly filled and that he should discontinue the fueling.

Fig. 4 illustrates modified types of nozzle and whistle. The inner member in this embodiment consists only of an annular collar 19 to which the outer member is connected by rivets, welding or swaging. If desired, a spacer ring may be positioned intermediate the two parts (not shown). For the formation of the sound device the outer member is provided with an interior recess 20 into which a cup-shaped member 21 is sunk. The corresponding openings 18 and 18a forming the air port are located in the recessed part of the nozzle wall and in the top face of the cupped member. This modification will, of course, continue the flexible "inner tube," shown in the figure, in the manner shown in Fig. 1 and with the same form and supporting means for the outer end of said flexible tube as shown in the latter figure. As stated above, the modification is only in the type of nozzle and whistle and the device as a whole would, in use, lie as shown in Fig. 1.

It is obvious that many changes may be made in the construction of the device without departing from the spirit and scope of the invention. It should, in particular, be emphasized that the nozzle may be used in combination with any suitable type of metallic or plastic tubing, the tubing with fitting in its upper extremity being shown only for the purpose of illustration. It is also possible to form the nozzle as a permanent attachment to the hose of the fuel dispensing station. It is also a matter of choice whether the nozzle is formed with a solid wall or is made of flexible tubing.

What I claim and desire to secure by Letters Patent is:

A venting device for fuel tanks of the type formed with a tubular inlet and an inner filled tube of smaller diameter held therein and a vapor outlet provided by the space intermediate the two tubes, said filler tube being provided with a nozzle having a tubular wall section spaced from the adjoining portion of the body of said tubular inlet, and said nozzle being provided in a recessed portion thereof with a sound device having an air port in communication with said vapor outlet and being adapted to be actuated by the suction force created through said air port by the entering fuel, until reaching of said air port by the filled-in fuel, the outlet area of the nozzle being at least equal to the outlet of the filler tube.

WARREN L. BALD.

REFERENCES CITED

The following references are of record in the file of this patent:

UNITED STATES PATENTS

| Number | Name | Date |
| --- | --- | --- |
| 1,990,386 | Kysor | Feb. 5, 1935 |
| 2,140,559 | Scully et al. | Dec. 20, 1938 |
| 2,391,040 | Scully | Dec. 18, 1945 |